(12) United States Patent
Jung et al.

(10) Patent No.: US 8,881,667 B2
(45) Date of Patent: Nov. 11, 2014

(54) CAVITATION DEVICE OF UNDERWATER MOVING BODY AND UNDERWATER MOVING BODY HAVING THE SAME

(75) Inventors: Chul Min Jung, Busan (KR); Chan Ki Kim, Gyeongsangnam-Do (KR); Warn Gyu Park, Busan (KR)

(73) Assignee: Agency for Defence Development, Daejeon (KR)

( * ) Notice: Subject to any disclaimer, the term of this patent is extended or adjusted under 35 U.S.C. 154(b) by 0 days.

(21) Appl. No.: 13/584,048

(22) Filed: Aug. 13, 2012

(65) Prior Publication Data

US 2013/0298819 A1 Nov. 14, 2013

(30) Foreign Application Priority Data

May 9, 2012 (KR) .................. 10-2012-0049179

(51) Int. Cl.
*B63B 1/36* (2006.01)
(52) U.S. Cl.
USPC .......................................................... 114/312
(58) Field of Classification Search
CPC ........ Y02T 70/121; Y02T 70/125; B63B 1/36
USPC ............ 114/20.1, 312, 330, 67 R, 67 A, 291; 103/399
See application file for complete search history.

(56) References Cited

U.S. PATENT DOCUMENTS

| 3,041,992 | A | * | 7/1962 | Lee | 114/312 |
| 3,871,318 | A | * | 3/1975 | Clerk | 114/67 A |
| 5,088,433 | A | * | 2/1992 | Osawa et al. | 114/67 R |
| 5,481,996 | A | * | 1/1996 | Osawa et al. | 114/67 R |
| 6,684,807 | B1 | * | 2/2004 | Smith | 114/285 |
| 8,408,155 | B2 | * | 4/2013 | Sancoff et al. | 114/282 |

\* cited by examiner

*Primary Examiner* — Edwin Swinehart
(74) *Attorney, Agent, or Firm* — Scully, Scott, Murphy & Presser, P.C.

(57) ABSTRACT

Disclosed are a cavitation device and an underwater moving body having the same. The underwater moving body includes a body; and a cavitation device for generating a cavity which encloses an outer circumferential surface of the body, wherein the cavitation device includes: a plurality of flap-up/down members rotatably connected to the body, disposed to cover the outer circumferential surface, and disposed in a circumferential direction and a lengthwise direction of the body in a matrix form; and a pressing module for flapping up the flap-up/down members such that the cavity is generated, as the flap-up/down members being rotated are inclined from the outer circumferential surface. Under this configuration, the cavitation device can freely generate a partial cavity or a super cavity on the surface of the underwater moving body. Furthermore, a ventilation module for forming a ventilated cavity may be coupled to the cavitation device.

9 Claims, 5 Drawing Sheets

CAVITATION DEVICE OF UNDERWATER MOVING BODY AND UNDERWATER MOVING BODY HAVING THE SAME

CROSS-REFERENCE TO RELATED APPLICATION

Pursuant to 35 U.S.C. §119(a), this application claims the benefit of earlier filing date and right of priority to Korean Application No. 10-2012-0049179, filed on May 9, 2012, and which is herein expressly incorporated by reference in their entireties.

BACKGROUND OF THE INVENTION

1. Field of the Invention

The present disclosure relates to a cavitation device for forming a cavity on the surface of an underwater moving body for very high speed, and an underwater moving body having the same.

2. Background of the Invention

Examples of an underwater moving body include a cylindrical moving body which moves underwater, such as a torpedo and a self-propelled decoy. Such underwater moving body has large friction resistance due to friction by water viscosity. Since the friction resistance occupies most of the entire resistance of the underwater moving body, research to reduce the friction resistance is actively ongoing.

Such research is performed in an active manner, e.g., by a turbulence control method using micro bubbles or polymer ejection or an electromagnetic force, and in a passive manner using rivelets, nano protrusions, and paint coating. As a new approach to significantly reduce friction resistance generated underwater due to contact with water, being developed is a cavity generator for enabling an underwater moving body to move at a high speed by contacting the underwater moving body with vapor, rather than water, by forming a cavity on a partial or entire region of the surface of the underwater moving body.

However, cavitation devices which have been developed so far have the following problems.

Firstly, the conventional cavitation device causes a great change of lift and drag due to a great cavity size and shape change.

Furthermore, sever problems are occurred to the underwater moving body due to tail-slapping and slamming, the slamming occurring when the cavity implodes (collapses) due to disturbances.

SUMMARY OF THE INVENTION

Therefore, an aspect of the detailed description is to provide a cavitation device capable of generating a partial cavity and a supercavity on the surface of an underwater moving body, and capable of allowing the underwater moving body to stably move, and an underwater moving body having the same.

To achieve these and other advantages and in accordance with the purpose of this specification, as embodied and broadly described herein, there is provided an underwater moving body, comprising: a body; and a cavitation device for generating a cavity which encloses an outer circumferential surface of the body. The cavitation device may include a plurality of flap-up/down members rotatably connected to the body, disposed to cover the outer circumferential surface, and disposed in a circumferential direction and a lengthwise direction of the body in a matrix form; and a pressing module for flapping up the flap-up/down members such that the cavity is generated, as the flap-up/down members being rotated are inclined from the outer circumferential surface.

According to an embodiment of the present invention, the pressing module may include motors mounted in the body, and configured to generate a reciprocating motion; and supporting bars having one ends connected to the motors, and the other ends which support the flap-up/down members. The motors may be independently controlled such that the shape of the cavity is controlled. At least part of the motors may be controlled to generate a lift force at the body, as the angle of the flap-up/down members is controlled.

According to an embodiment of the present invention, the rear flap-up/down member may be disposed, in the lengthwise direction, so as to be positioned inside the cavity formed due to the front flap-up/down member.

According to an embodiment of the present invention, accommodation grooves for accommodating the flap-up/down members therein may be formed on the outer circumferential surface of the body, such that the flap-up/down members form a consecutive planar or curved surface together with the outer circumferential surface. One ends of the flap-up/down members may be rotatably connected to the accommodation grooves, and the other ends thereof may form free ends which rotate by pressing from the pressing module.

According to an embodiment of the present invention, an opening may be formed between the outer circumferential surface and the flap-up/down member by flapping up and down of the flap-up/down member. The cavitation device may include a ventilation module mounted in the body, and configured to ventilate fluid towards the opening.

The fluid may be ventilated cavitation gas, and the ventilation module may be configured to control the amount of ventilated cavity gas.

To achieve these and other advantages and in accordance with the purpose of this specification, as embodied and broadly described herein, there is also provided a cavitation device mounted in an underwater moving body, and configured to generate a cavity on an outer circumferential surface of the underwater moving body, the cavitation device comprising: a plurality of flap-up/down members rotatably connected to the outer circumferential surface of the underwater moving body, disposed to cover the outer circumferential surface, and disposed in a circumferential direction and a lengthwise direction of the outer circumferential body in a matrix form; and a pressing module for flapping up the flap-up/down members such that the cavity is generated, as the flap-up/down members being rotated are inclined from the outer circumferential surface. The flap-up/down members may be independently controlled such that the shape of the cavity is controlled.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, a cavitation device and an underwater moving body having the same according to the present invention will now be given in detail of the exemplary embodiments, with reference to the accompanying drawings. The same or similar components of one embodiment as or to those of another embodiment will be provided with the same or similar reference numerals, and their detailed explanations will be omitted. A singular expression includes a plural concept unless there is a contextually distinctive difference therebetween.

Figure 1:
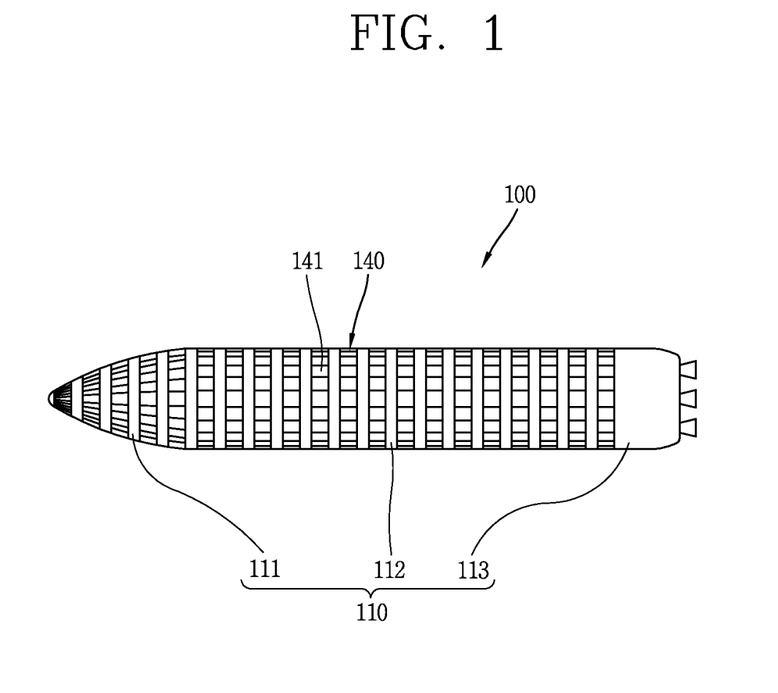
FIG. 1 is a conceptual view illustrating an underwater moving body according to an embodiment of the present invention.
Figure 2A:
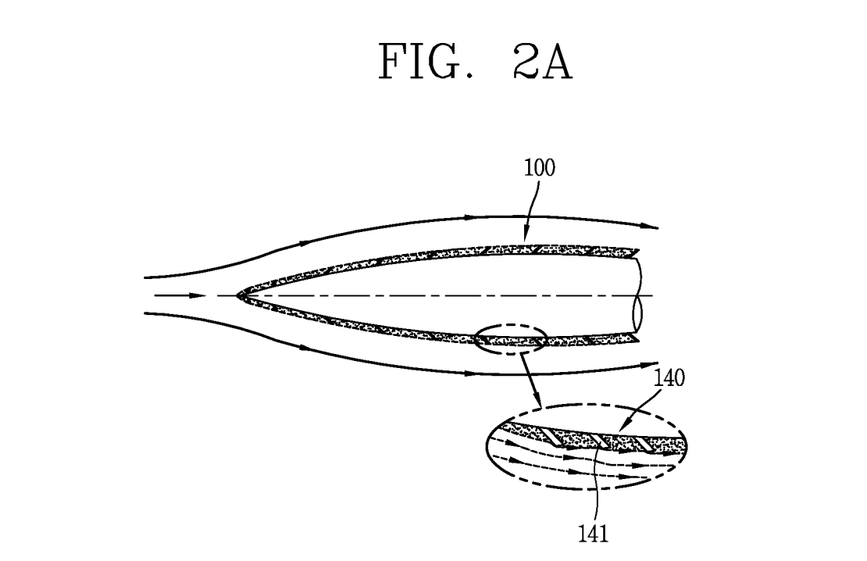
FIGS. 2A to 2D are conceptual views illustrating generation of a partial cavity and a super cavity.
Figure 2B:
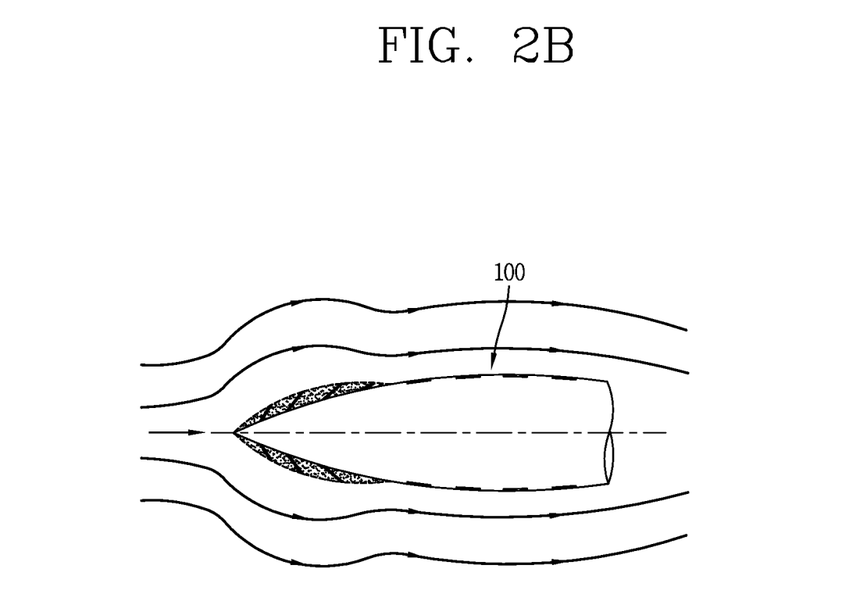
Figure 2C:
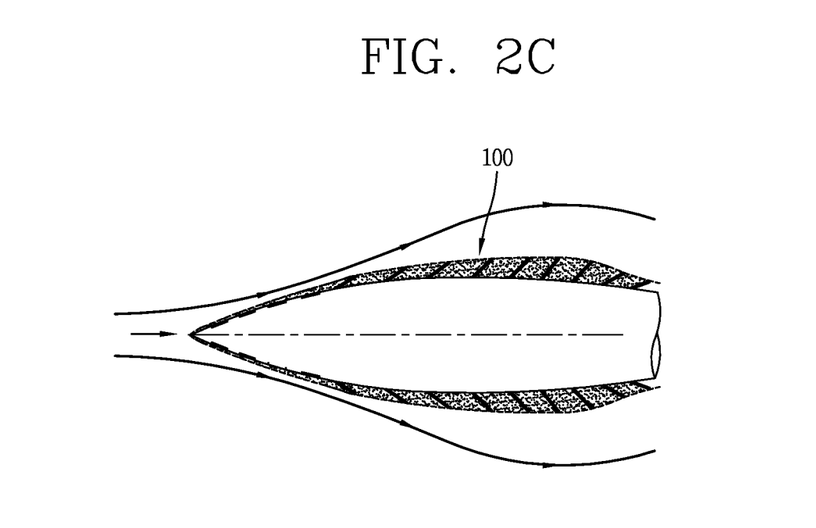
Figure 2D:
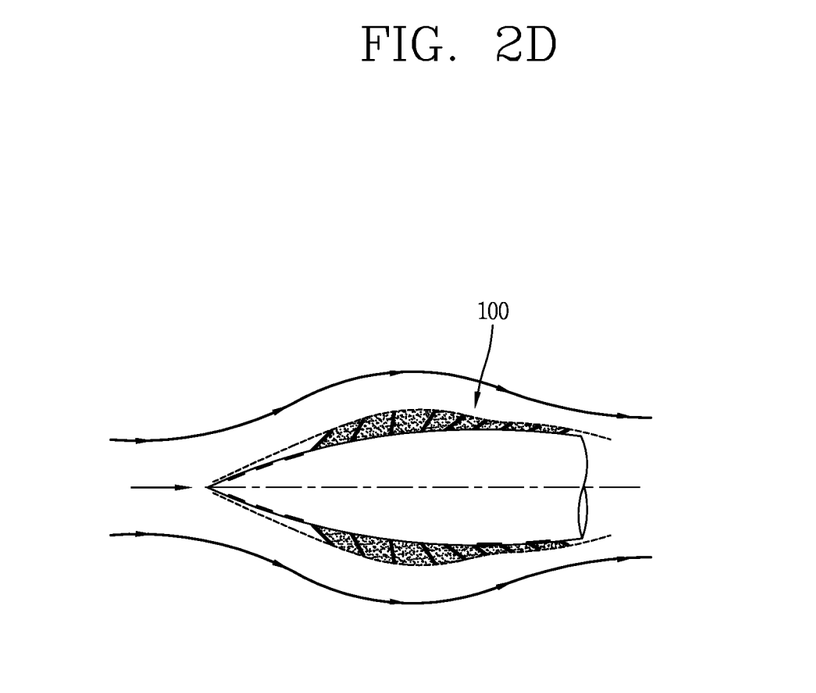

FIG. 1 is a conceptual view illustrating an underwater moving body according to an embodiment of the present invention, and FIGS. 2A to 2D are conceptual views illustrating generation of a partial cavity and a super cavity.

FIG. 1 illustrates a super cavity torpedo which moves underwater, as an example of an underwater moving body 100. As shown, the underwater moving body 100 is movable underwater, and has a cylindrical shape between the front side and the rear side. More specifically, a body 110 of the underwater moving body 100 includes a front portion 111, a middle portion 112 and a rear portion 113. In the present invention, a cylindrical underwater moving body is explained. However, the underwater moving body of the present invention is not limited to the cylindrical shape, but may have other various shapes including an oval section, a wing shape, etc.

As shown, the underwater moving body 100 includes a cavitation device 140. The cavitation device 140 is configured to generate a cavity which encloses an outer circumferential surface of the body. More specifically, the cavitation device 140 includes a plurality of flap-up/down members 141 disposed in a circumferential direction and a lengthwise direction of the body 110, respectively, in a matrix form. The flap-up/down members 141 may be defined as rotation members because flap-up or down movements may be occurred through the rotating of the members 141. The flap-up/down members 141 may be disposed over the front portion 111 and the middle portion 112, or may be disposed to extend up to part of the rear portion 113.

The flap-up/down members 141 may be independently controlled such that the shape of the cavity can be controlled.

Referring to FIGS. 2A to 2D, the cavitation device 140 generates a partial cavity and a super cavity by controlling the flap-up/down members 141 attached to the surface of the underwater moving body 100 in a matrix form. The rear flap-up/down member is disposed, in a lengthwise direction, so as to be positioned inside the cavity formed due to the front flap-up/down member.

Once each of the flap-up/down members is unfolded at a high speed, motion of the underwater moving body 100 changes. And, rear part of the flap-up/down member has drastic pressure lowering into a value lower than saturated vapor pressure of water, thereby resulting in occurrence of a cavity. Such partially-occurred cavity which is about to have pressure restoration, has pressure lowering again as another flap-up/down member is unfolded at a point where the cavity disappears. As a result, the partially-occurred cavities form the entire shape of a partial or super cavity by being integrated with each other. The size and the length of the cavity can be controlled by controlling the angle and the pitch of each of the flap-up/down members attached to the surface of the underwater moving body 100 in a matrix form.

The cavitation device 140 may generate braking power by flapping up each of the flap-up/down members at a maximum angle. Furthermore, the cavitation device 140 may generate a lift force by an angle difference between flap-up/down members of cavity generators disposed on the upper and lower surfaces of the underwater moving body. And, the cavitation device 140 may freely generate three-dimensional (3D) moments of pitching, rolling and yawing. This can significantly enhance mobility of the underwater moving body.

Figure 3A:
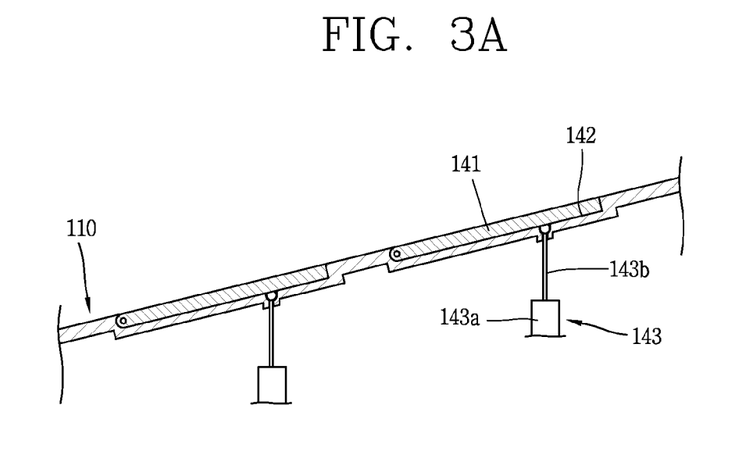
FIGS. 3A and 3B are sectional views illustrating the operation of a cavitation device according to the present invention.
Figure 3B:
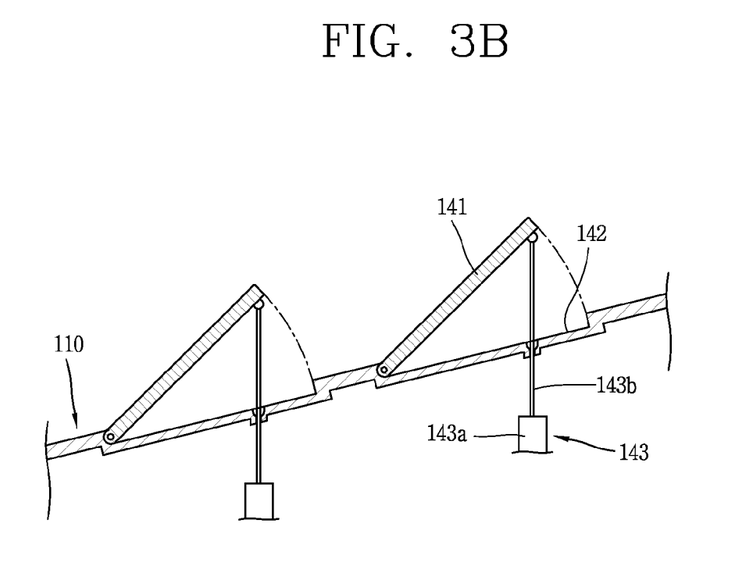

Hereinafter, the cavitation device 140 of the underwater moving body of FIG. 1 will be explained in more details with reference to FIGS. 3A and 3B. FIGS. 3A and 3B are sectional views illustrating the operation of the cavitation device according to the present invention.

Referring to FIG. 3A, a plurality of flap-up/down members 141 are rotatably connected to a body 110 of an underwater moving body, and are disposed to cover an outer circumferential surface of the body 110.

More specifically, accommodation grooves 142 for accommodating therein the flap-up/down members 141 are provided on the outer circumferential surface. And, the flap-up/down members 141 form a consecutive planar or curved surface together with the outer circumferential surface, in an accommodated state in the accommodation grooves 142. For instance, one ends of the flap-up/down members 141 are rotatably connected to the accommodation grooves 142 by pivoting, hinge-coupling, etc. Which allows the flap-up/down members 141 to oscillatory flap-up/down from the accommodation grooves 142.

Referring to FIGS. 3A and 3B, a pressing module 143 for pressing the flap-up/down members 141 is disposed in the underwater moving body, such that a cavity can be generated as the flap-up/down members 141 being rotated (or flapped up) are inclined from the outer circumferential surface. Under this configuration, the other ends of the flap-up/down members 141 form free ends which rotate by pressure from the pressing module 143.

The pressing module 143 includes motors 143a and supporting bars 143b.

The motors 143a serve to generate a reciprocating motion by being mounted in the body, which may be fluid power motors, servo motors, etc.

One ends of the supporting bars 143b are connected to the motors, and the other ends thereof are configured to support the flap-up/down members 141. If the supporting bars 143b push the flap-up/down members 141 between two ends of the flap-up/down members 141 as the motors 143a are driven, the flap-up/down members 141 rotate centering around one ends thereof (rotation fixing ends). As a result, the flap-up/down members of the cavitation device 140, disposed in a matrix form, perform flap motions in upper and lower directions.

Although not shown, springs may be provided so as to elastically support the flap-up/down members 141, such that the flap-up/down members 141 can return to the original positions, when the supporting bars 143b move back towards the inside of the body. For instance, the flap-up/down members 141 may be hinge-coupled to the accommodation grooves 142, and plate springs may provide an elastic force to hinge shafts. Alternatively, coil springs may be connected to the flap-up/down members 141.

Referring to FIG. 3B, once the motors 143a are driven, each of the respective flap-up/down members is in an unfolded state as an umbrella becomes unfolded. As a result, a cavity is generated. The shape and the size of the generated cavity may be controlled by controlling the angle of the flap-up/down members. To this end, the motors 143a may be independently controlled. And, at least part of the motors 143a may be controlled such that a lift force can be generated at the body 110 of the underwater moving body, as the angle of the flap-up/down members 141 is controlled. The lift force is generated by the planning force difference between the upper and lower surface.

If a cavity is generated by a single cavity generator or a small number of cavity generators attached to the front end of the conventional underwater moving body, a great load is applied to the cavitation device of a small area in a concentrative manner. Furthermore, severe changes of cavity length, forces and moments may be caused even by a very small change of an angle of attack or an inclination angle of the cavitation device. In the present invention, since the cavitation device is distributed on the entire surface of the underwater moving body, the structural problem of the cavitation device due to a concentrated load can be solved by the distributed load and the cavity may be more stable. Furthermore, this can allow the underwater moving body to stably move.

The cavitation device of the present invention may be modified in various manners.

Figure 4A:
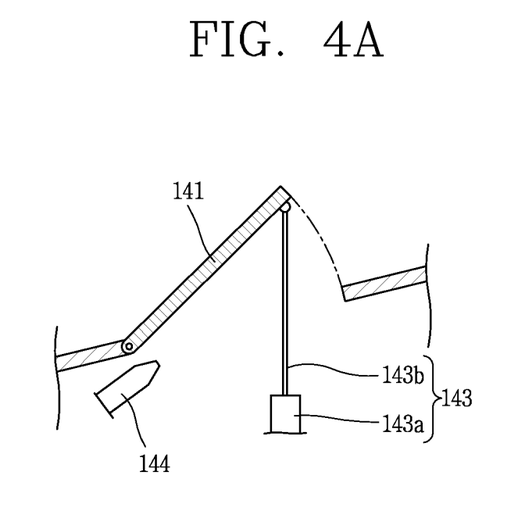
FIGS. 4A and 4B are sectional views illustrating another embodiment of a cavitation device according to the present invention.
Figure 4B:
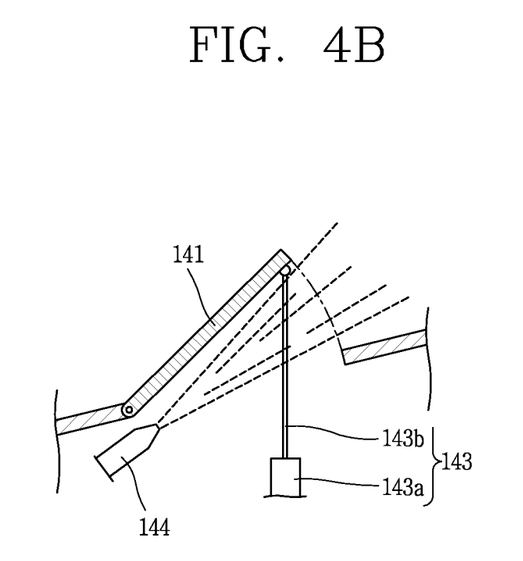

FIGS. 4A and 4B are sectional views illustrating another embodiment of a cavitation device according to the present invention.

As shown, a ventilation module (ventilated cavity module) is disposed inside each flap-up/down member 141, thereby generating a partial cavity and a supercavity and controlling the cavity size through ventilated cavity gas spray.

More specifically, as the flap-up/down member 141 rotates, an opening is formed between the outer circumferential surface of the underwater moving body and the flap-up/down member 141. And, a ventilation module 144 is mounted in the body 110 of the underwater moving body as part of the cavitation device 140, thereby ventilating fluid, such as ventilated cavity gas, towards the opening. In this case, the ventilation module is formed to control the flow amount of the ventilated cavity gas.

The present invention may have the following advantages.

Firstly, the respective flap-up/down members disposed in a matrix form independently flap up and down in upper and lower directions. This can allow a partial cavity or a supercavity to be freely generated on a partial or entire region of the underwater moving body according to each speed. The cavitation device can control the length and the size of a cavity, and can also generate braking power by flapping up the flap-up/down members at an angle of 90°. Furthermore, the cavitation device can freely generate three-dimensional moments of pitching, rolling and yawing, by generating a lift force due to an angle difference between the flap-up/down members of the cavitation devices disposed on the upper and lower surfaces of the underwater moving body. This can allow motion of the underwater moving body to be controlled.

Furthermore, the cavitation device can have enhanced performance and ventilated cavity hysteresis effect can be greatly reduced, owing to the ventilated cavity module. This can allow the size of a cavity to be more effectively controlled. The ventilated cavity module can be applied to an underwater moving body of any shape, and can generate a partial cavity and a supercavity effective to an underwater moving body of any shape.

Besides, since a partial cavity and a super cavity formed by the cavitation device of the present invention have smaller thicknesses than those of the conventional art, an interaction between surface signature and the free surface of water can be greatly reduced. This can allow the cavitation device to be less recognized by observation equipment of a counter party.

Besides, an impact force due to slamming phenomenon occurring from temporal implosion of a cavity can be greatly reduced. Besides, the flap-up/down member of the cavitation device is made to flap-up at a region where a cavity implodes, thereby reducing an occurrence range of slamming phenomenon into a partial area from a large area. Since a re-entrant jet phenomenon of a cavity is greatly reduced, a cavity can be more stably generated. Since a change of a lift force and moments of the underwater moving body is greatly reduced, the underwater moving body can be more stably moved. Furthermore, tail-slapping phenomenon occurring from the external cavity surface of the conventional cavitation device can be significantly reduced.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An underwater moving body, comprising:
    a body; and
    a cavitation device for generating a cavity which encloses an outer circumferential surface of the body,
    wherein the cavitation device comprises:
    a plurality of flap-up/down members, which members are rotatably connected to the body, disposed to cover the outer circumferential surface, and disposed in a circumferential direction and a lengthwise direction of the body; and
    a plurality of pressing modules, wherein each pressing module is configured to flap up a respective flap-up/down member to generate the cavity associated with the respective flap-up/down member, when the flap-up/down members are being rotated to incline from the outer circumferential surface,
    wherein the plurality of flap-up/down members comprises a plurality of front flap-up/down members and a plurality of rear flap-up/down members, wherein the rear flap-up/down members are disposed in the lengthwise direction inside the cavity formed due to the front flap-up/down members,
    wherein the cavitation device is configured to be multi-functional, wherein the plurality of flap-up/down members are configured to flap up in a predetermined angle range, in which the friction resistance of the moving body due to water viscosity is smaller than the friction resistance of the moving body due to water viscosity when the plurality of flap-up/down members are not in the predetermined angle range, and wherein a braking power is generated by the flapping-up movement of each flap-up/down member at a maximum angle of the angle range.

2. The underwater moving body of claim 1, wherein the pressing module includes:

motors mounted in the body, and configured to generate a reciprocating motion; and supporting bars having one ends connected to the motors, and the other ends which support the flap-up/down members.

3. The underwater moving body of claim 2, wherein the motors are independently controlled such that the shape of the cavity is controlled.

4. The underwater moving body of claim 3, wherein at least part of the motors is controlled to generate a lift force at the body, as an angle of the flap-up/down members is controlled.

5. The underwater moving body of claim 1, wherein accommodation grooves for accommodating the flap-up/down members therein are formed on the outer circumferential surface of the body, such that the flap-up/down members form a consecutive planar or curved surface together with the outer circumferential surface.

6. The underwater moving body of claim 5, wherein one ends of the flap-up/down members are rotatably connected to the accommodation grooves, and the other ends thereof form free ends which rotate by pressing from the pressing module.

7. The underwater moving body of claim 1, wherein an opening is formed between the outer circumferential surface and the flap-up/down member by flapping up and down of the flap-up/down member.

8. The underwater moving body of claim 7, wherein the cavitation device further includes a ventilation module mounted in the body, and configured to ventilate fluid towards the opening.

9. The underwater moving body of claim 8, wherein the fluid is ventilated cavitation gas, and the ventilation module is configured to control a flow amount of ventilated cavity gas.

* * * * *

UNITED STATES PATENT AND TRADEMARK OFFICE
CERTIFICATE OF CORRECTION

| | | |
|---|---|---|
| PATENT NO. | : 8,881,667 B2 | Page 1 of 1 |
| APPLICATION NO. | : 13/584048 | |
| DATED | : November 11, 2014 | |
| INVENTOR(S) | : Jung et al. | |

It is certified that error appears in the above-identified patent and that said Letters Patent is hereby corrected as shown below:

On the title page,

Should read:

Item (73) Agency for Defense Development, Daejeon (KR)

Signed and Sealed this
Twenty-sixth Day of May, 2015

Michelle K. Lee
*Director of the United States Patent and Trademark Office*